W. L. BEATY.
REEL SEAT.
APPLICATION FILED APR. 16, 1919.
1,350,635.
Patented Aug. 24, 1920.
2 SHEETS—SHEET 1.
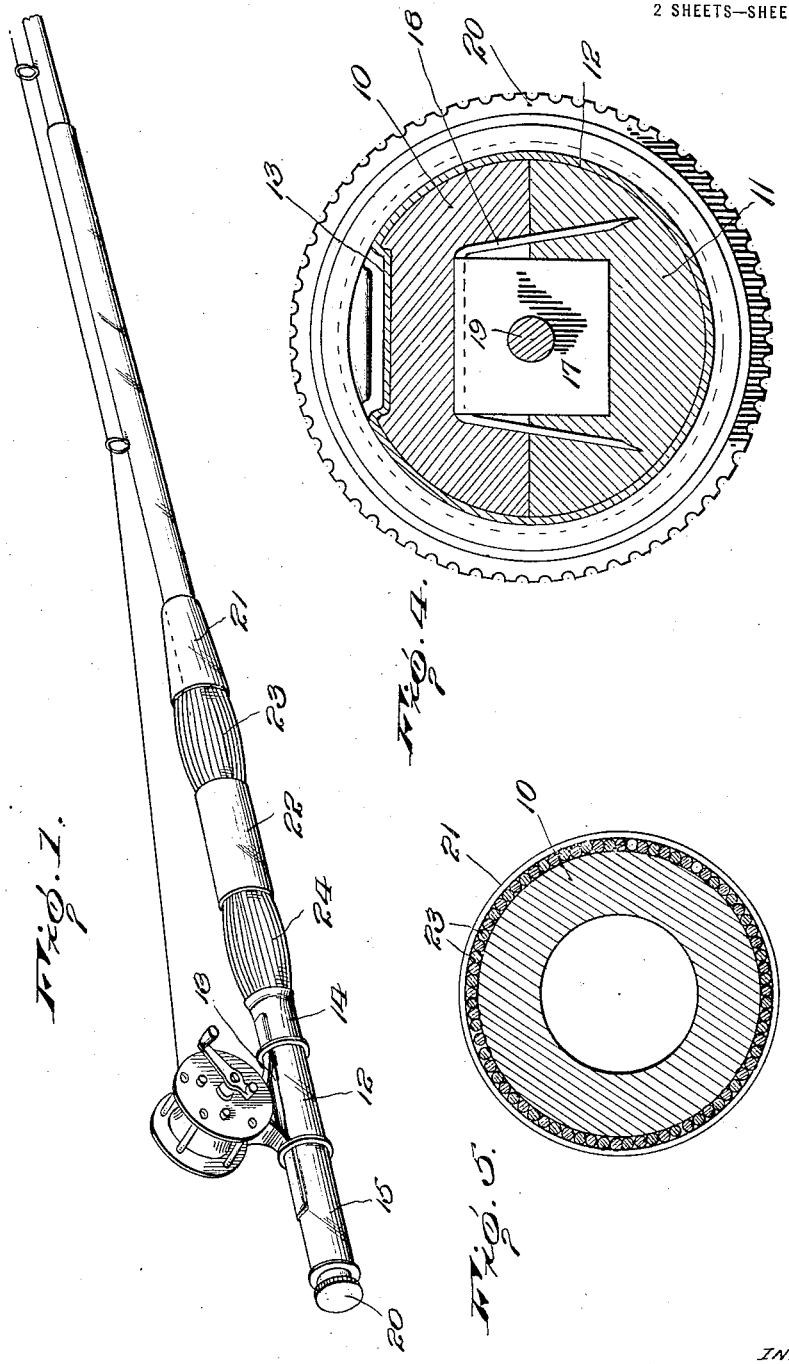
INVENTOR
Wilbur L. Beaty,
by Lacey & Lacey, Atty's.

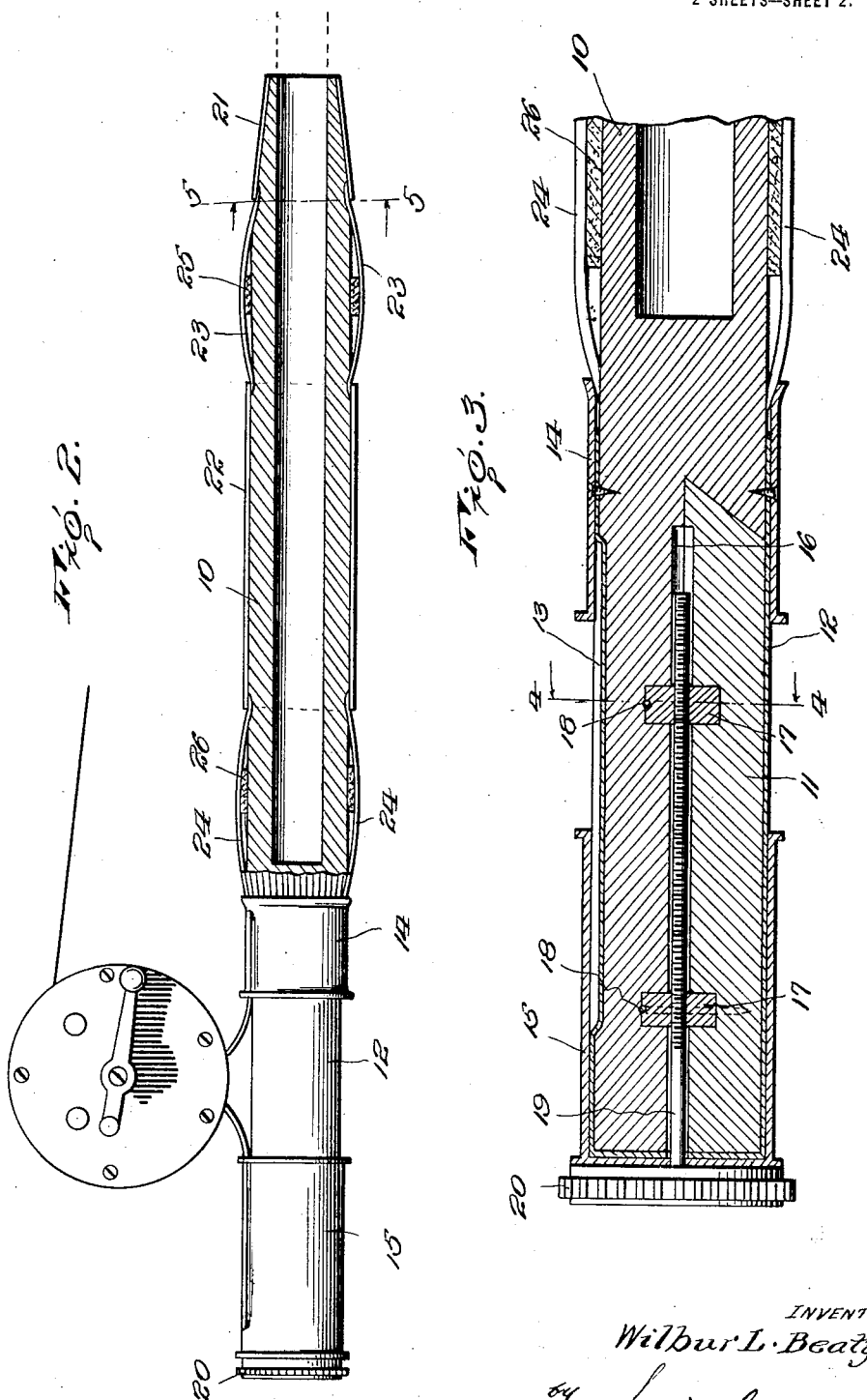

UNITED STATES PATENT OFFICE.

WILBUR L. BEATY, OF SOUTH BUTTE, MONTANA.

REEL-SEAT.

1,350,635.  Specification of Letters Patent.  Patented Aug. 24, 1920.

Application filed April 16, 1919. Serial No. 290,623.

*To all whom it may concern:*

Be it known that I, WILBUR L. BEATY, citizen of the United States, residing at South Butte, in the county of Silver Bow and State of Montana, have invented certain new and useful Improvements in Reel-Seats, of which the following is a specification.

This invention relates to an improved handle for fishing rods and has as one of its principal objects to provide a handle which will be particularly light and which will also be formed with an effective hand grasp.

The invention has as a further object to provide a handle which will include an improved reel seat.

And the invention has as a still further object to provide a reel seat employing means which may be adjusted for tightly binding a reel upon the seat and which will securely hold the reel against accidental disengagement from the seat.

Other and incidental objects will appear hereinafter. In the accompanying drawings:

Figure 1 is a perspective view of my improved handle showing a conventional type of reel in position upon the reel seat of the handle, Fig. 2 is a fragmentary longitudinal sectional view taken through the body of the handle, Fig. 3 is a longitudinal sectional view on an enlarged scale, this view being taken through the reel seat of the handle, Fig. 4 is an enlarged transverse sectional view taken on the line 4—4 of Fig. 3, and Fig. 5 is a transverse sectional view taken on the line 5—5 of Fig. 2.

In carrying the invention into effect, I employ a handle body or core 10 which is bored out for the major portion of its length for lightening the handle and also providing a socket for receiving, in the well known manner, the initial section of a rod. In Fig. 1 the portion of the rod illustrated is of conventional design. The rear end portion of the core is, as shown in Fig. 3, split medially and longitudinally to provide a detachable section 11 and fitting over the rear end portion of the handle to secure this section in position is a shell or jacket 12. At its upper side the jacket is formed with a depressed portion or channel 13 and surrounding the jacket at its inner end is a collar or sleeve 14 secured by screws or other suitable fastening devices which also act to secure the jacket. Slidable over the outer end of the jacket is a sleeve or cap 15. At the inner longitudinal face of the section 11 the butt of the core is formed with an axial bore 16 and intersecting this bore are spaced nuts 17 received within suitable recesses in the portion of the butt of the core above the section 11 and seated in appropriate sockets formed in said section. As shown in detail in Figs. 3 and 4, the nuts 17 are provided in their upper side edges with transverse grooves and engaging in these grooves are staples 18 embedded in the section 11 and firmly connecting the nuts therewith. This construction provides an arrangement whereby the nuts 17 may be initially mounted upon the section 11 and the section then disposed in place as shown in Fig. 3 for sustaining the nuts in active position. Threaded through the nuts 17 is an adjusting screw or follower 19 which is freely received through the end of the cap 15 within the bore 16 and, at its outer terminal is provided with a head 20 confronting the end of the cap and which is preferably milled so that the screw can be easily rotated.

In Figs. 1 and 2, I have shown a conventional type of reel mounted upon the reel seat. In connecting the reel with the seat, the ends of the reel base are rested within the channel 13 when the forward end of the base is engaged beneath the collar 14. The adjusting screw 19 is then turned to engage the cap 15 over the rear end of the base. Thus, the reel may be easily and quickly secured in place and, in this connection, it will be observed that the screw 19 may be turned to tightly bind the reel upon the seat. Furthermore, it will be seen that the adjusting screw will prevent movement of the cap to free the reel so that possibility of accidental displacement of the reel from the seat will be effectually overcome. The channel 13 will, of course, prevent the reel from slipping around the jacket 12, but to further guard against this possibility, the collar 14 and cap 15 are, as particularly shown in Figs. 1 and 2, provided with shoulders to coact with the end portions of the reel base.

Surrounding the outer end of the core 10 is a ferrule 21 and tightly fitted upon the core substantially midway between this ferrule and the collar 14 is a sleeve 22. This sleeve is preferably formed of celluloid and provides the intermediate portion of the grip or handle. The remainder of the grip is formed by quill covered areas 23 and 24 respectively. Porcupine quills are preferably employed. The quills of the first area are arranged side by side in abutting relation to extend entirely around the core and the forward ends of said quills are, as particularly shown in Fig. 2, engaged beneath the rear margin of the ferrule 21 while the rear ends of said quills are engaged beneath the forward end of the sleeve 22. Holding the intermediate portions of these quills against distortion or displacement is a band 25 of adhesive tape snugly engaged around the core and arranged with its adhesive surface presented to the quills so that the quills are thus secured by the band. The quills of the area 24 are mounted in like manner. The forward ends of the quills of this latter area are engaged beneath the rear end of the sleeve 22 while the rear ends of said quills are engaged beneath the forward end of the collar 14. Securing the intermediate portions of said quills is a band 26 of adhesive tape corresponding to the band 25 and arranged in like manner. Thus, it will be seen that the quill covered areas will afford a firm purchase for the hand of the operator. At the same time the handle will be particularly light and the grip will not be subject to corrosion.

Having thus described the invention, what is claimed as new is:

1. A reel seat including a core provided with a removable section, means securing said section in place, a nut carried by the section, a staple bearing over the nut and connecting the nut with the section, reel engaging means fixed with respect to the core, a cap slidably fitting over the core and adapted to coact with said means for connecting a reel with the core, and an adjusting screw freely received through the cap and threaded through said nut for advancing the cap.

2. A reel seat including a shell, reel engaging means carried thereby, a cap fitting over the outer end of the shell and shiftable to coact with the reel engaging means for connecting a reel with the shell, and means adjustable for advancing the cap, the cap being movable toward or away from said reel engaging means independently of said last mentioned means.

3. A reel seat including a shell, reel engaging means carried thereby, a cap fitting over the outer end of the shell and shiftable to coact with said means for connecting the reel with the shell, and means independent of the cap but received therethrough for adjustment to advance the cap.

4. A reel seat including a shell, reel engaging means carried thereby, a cap fitting over the outer end of the shell and shiftable to coact with said means for connecting a reel with the shell, and an adjusting screw operatively engaged with the shell and coacting with the cap for advancing the cap, the cap being movable toward or away from said means independently of the screw.

5. A reel seat including a sectional core, reel engaging means with respect to the core, reel engaging means shiftable relative to the core to coact with the first means for connecting a reel with the core, adjusting means for the second means, and means held by the core sections therebetween for engagement by said adjusting means.

6. A reel seat including a core split to provide mating sections, a nut carried by one of said sections, coacting slidable and fixed reel engaging means associated with the core, and an adjusting screw operatively engaged with the slidable means and threaded through said nut, the screw being rotatable for advancing said slidable means.

7. A reel seat including a core split to provide mating sections, coacting slidable and fixed reel engaging means associated with the core, means adjustable for advancing the slidable means, and means carried by one of the core sections for engagement by said adjustable means.

8. A reel seat including a sectional core, a shell securing the core sections in mating relation, slidable and fixed reel engaging means carried by the shell, means adjustable for advancing said slidable means, and means carried by one of the core sections for engagement by said adjusting means.

9. A reel seat including a core split to provide mating sections, coacting slidable and fixed reel engaging means associated with the core, means adjustable for advancing the slidable means, means carried by one of the core sections for engagement by said adjustable means, and means securing said last mentioned means fixed upon said core section.

In testimony whereof I affix my signature
WILBUR L. BEATY. [L. S.]